United States Patent [19]
Champenois et al.

[11] Patent Number: 5,672,417
[45] Date of Patent: Sep. 30, 1997

[54] TURBOMACHINE BLADE MADE OF COMPOSITE MATERIAL

[75] Inventors: Christophe Jean Roger Champenois, Soisy sur Seine; Laurent Jean Pierre David, St. German les Corbeil; Gérard François Inizan, Yerres, all of France

[73] Assignee: Societe Nationale D'etude et de Construction de Moteurs D'aviation "Snecma", Paris, France

[21] Appl. No.: 623,013

[22] Filed: Mar. 28, 1996

[30] Foreign Application Priority Data

Mar. 29, 1995 [FR] France ............................ 95 03665

[51] Int. Cl.⁶ .................... B29C 70/24; B32B 5/26; B32B 7/00
[52] U.S. Cl. ............ 428/257; 428/232; 428/245; 87/1; 87/8; 416/230
[58] Field of Search ..................... 428/232, 245, 428/246, 257; 87/1, 8; 416/230

[56] References Cited

U.S. PATENT DOCUMENTS

| | | |
|---|---|---|
| 2,866,483 | 12/1958 | Watts et al. |
| 4,174,739 | 11/1979 | Rasero et al. |
| 4,312,913 | 1/1982 | Rheaume |
| 4,363,602 | 12/1982 | Martin ................. 416/230 |
| 4,410,385 | 10/1983 | Murphy et al. ........... 156/181 |
| 4,576,770 | 3/1986 | Schultz ................. 264/103 |
| 5,279,892 | 1/1994 | Baldwin et al. |
| 5,308,228 | 5/1994 | Benoit et al. ........... 416/230 |

FOREIGN PATENT DOCUMENTS

| | | |
|---|---|---|
| 2 375 441 | 7/1978 | France . |
| 2 610 951 | 8/1988 | France . |
| 2 664 941 | 1/1992 | France . |
| 2 117 844 | 10/1983 | United Kingdom . |
| 2 262 315 | 6/1993 | United Kingdom . |

*Primary Examiner*—Daniel Zirker
*Attorney, Agent, or Firm*—Oblon, Spivak, McClelland, Maier & Neustadt, P.C.

[57] ABSTRACT

A turbomachine blade, particularly a fan blade for an aircraft jet engine, is made of a composite material comprising reinforcing fibres embedded in a thermosetting resin matrix, wherein the reinforcing fibres form a multilayer woven fabric in which the warp fibres of each layer are interwoven not only with the weft fibres of the layer but also with the weft fibres of at least the layers immediately above and below it so that the layers are all interconnected. Also, each layer only partly covers the layer below it so that the ends of the warp and weft fibres of a layer extend to near the surface of the blade, and the thickness of the blade at any point is determined by the number of layers present at that point.

15 Claims, 1 Drawing Sheet

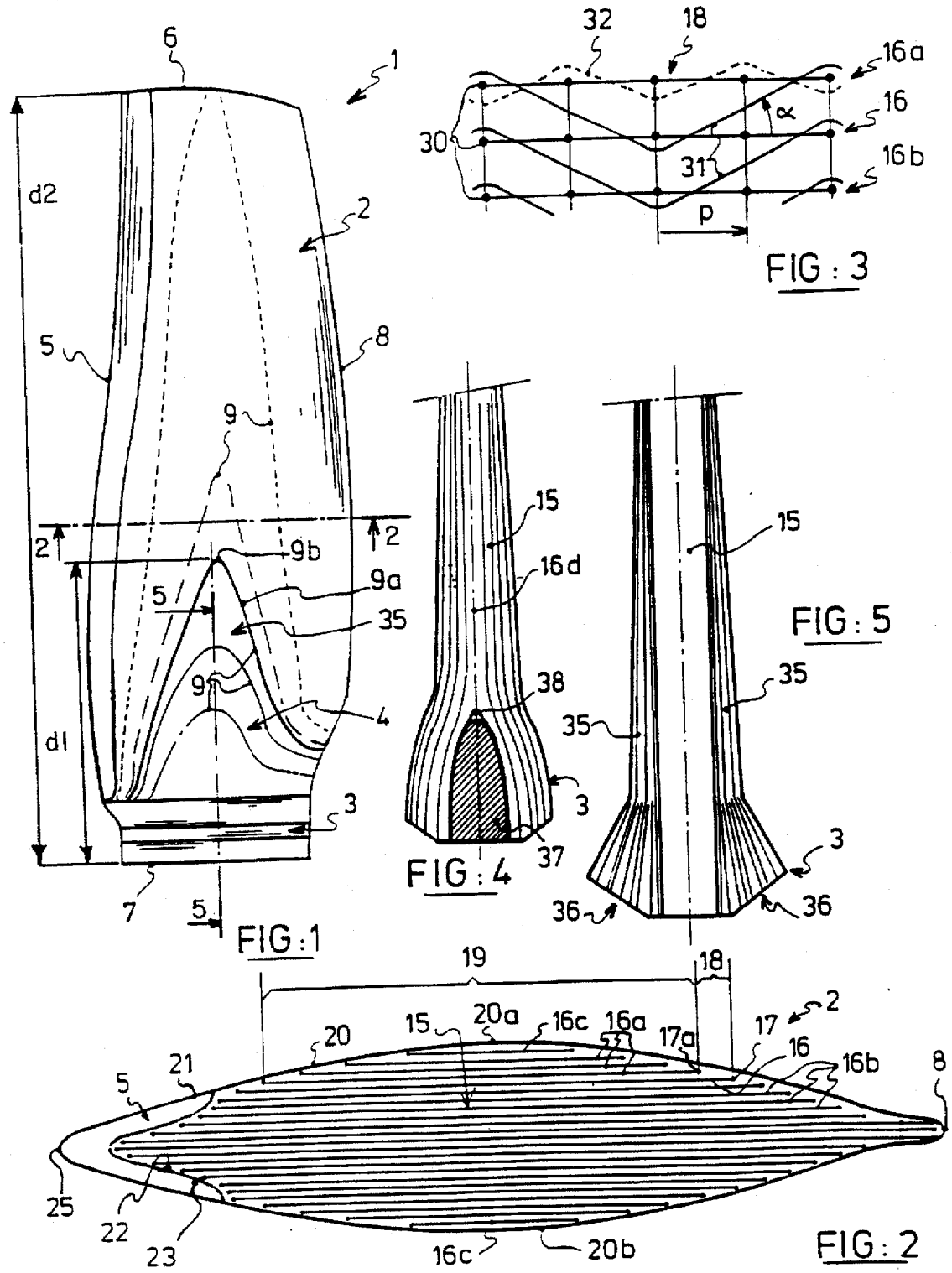

TURBOMACHINE BLADE MADE OF COMPOSITE MATERIAL

BACKGROUND TO THE INVENTION

1. Field of the Invention

This invention relates to turbomachine blades made of a composite material having an organic matrix, and is applicable particularly, but not exclusively, to the fan blades of aircraft jet engines.

2. Summary of the Prior Art

Turbomachine blades made of a composite material comprising reinforcing fibres impregnated by an organic matrix are used in aircraft jet engines and are valued for their lightness compared to metal blades, and also for their strength. Such blades are conventionally made using glass or carbon fibre or Kevlar or the like, together with a high-strength thermosetting resin matrix. Materials of this kind have satisfactory strength in the direction of the fibres but are less strong perpendicularly thereto. Similar considerations apply to rigidity when using fibres having a high modulus of elasticity, such as carbon. The fibres are disposed in bundles and/or superposed sheets of fabric arranged in shell-fashion or draped around a core.

The superposed fabric sheets provide satisfactory strength in the sheet plane, particularly in the directions of their constituent weft and warp fibres, but their strength in directions perpendicular to the sheets is poor. The unsticking of the fabric sheets of the composite material from one another is called "delamination". In order to improve the ability of the blade to withstand impacts by foreign bodies the fabric sheets are conventionally disposed without interruptions along the blade surface, the arrival of the end of a fabric sheet in the surface of the blade leading to a tendency to delamination at this position.

This technology is unsatisfactory for the fan blades of aircraft jet engines, particularly in the case of wide-chord blades—i.e. blades in which there is a considerable distance between the leading edge and the trailing edge. Blades of this kind may be up to 1200 mm long and have a distance of 500 mm between the leading edge and the trailing edge, yet must still be thin and light. Also, they are particularly exposed to impacts from foreign bodies, such as birds, sucked in by the jet engine.

Of the various stresses experienced by these blades, two require conflicting technical solutions.

1) The blade vibrates in various modes, notably in bending and torsion. To counter this, blade rigidity must be increased, and substantial densities of fibres made of a material having a high modulus of elasticity must be disposed in the body of the blade.

2) The blade experiences impacts from foreign bodies which can cause rupture of the matrix between the fabric sheets so that they disengage from one another. This rupture or delamination starts at the point of impact, then spreads between the fabric sheets concerned. The problem is that delamination is boosted by the rigidity which the blade must have in order to prevent absorption of the impact shocks.

Fabrics having a number of layers which are directly woven together by supplementary fibres, the latter extending through the layers and being woven with warp and weft fibres of each layer, are known. These fabrics are called 3D, 4D, 5D and so on, D denoting dimension. The supplementary fibres provide the fabric with substantial resistance to delamination, but increase the weight thereof without improving the strength of the material in the plane of the layers.

Also known from French Patent 2 610 951 is a multilayer fabric whose warp fibres each extend through a number of layers and which can provide thin structures, notably for heat protection elements for space craft. For a given weight these fabrics are stronger than the 3D fabrics previously mentioned, but they do not solve the problem of delamination between the fabric sheets which are subsequently assembled in successive layers to form a blade.

French Patent 2 664 941 discloses a composite blade in which resistance to delamination caused by impact has been improved by interleaving resilient connecting agents between different layers. Unfortunately, this solution to the problem reduces the rigidity of the blade and therefore lowers its natural resonance modes.

To increase the resistance of the blade to delamination the said French Patent 2 664 941 also proposes that the various fabric sheets be stitched together by supplementary fibres, but the stitching lines and points remain, of necessity, at a distance from one another and commencement of delamination may still occur in the resulting gaps. Increasing the stitch point density does not solve the problem since the stitch points would have to be very close together to counter delamination commencement effectively. This amount of stitching is out of the question for large blades. It would increase blade weight and cause distortion in the network formed by the fibres of the fabrics.

U.S. Pat. No. 5,279,892 discloses a blade comprising a multilayer fabric central part sandwiched between two cambered shells each formed by a stack of fabric layers, the whole being maintained, for example, by stitches as in the techniques previously mentioned. In each shell each fabric layer projects beyond a more inward fabric layer and covers it completely to ensure that the edges of the fabric layers are not flush with the blade surface except for the outermost layers. This blade also fails to solve the problem of delamination between the fabric layers except for the central multilayer fabric part, but this is unsatisfactory because the central part is the least stressed part and is protected by the shells from impacts by foreign bodies, and because the leading edge must in any case be covered by a harder covering since it is the part most exposed to impacts by foreign bodies.

We are unaware of any commercial wide-chord composite fan blade providing dynamic strength and shock resistance performance meeting the specifications of the Federal Aviation Administration (F.A.A.), which is the United States body which sets the standards recognised by most countries.

SUMMARY OF THE INVENTION

With this in mind it is an object of the invention to provide a composite blade comprising reinforcing fibres embedded in an injectable hardenable matrix, the blade having an impact strength compatible with its operating conditions yet being light and very rigid.

Accordingly, there is provided a turbomachine blade made of a composite material comprising reinforcing fibres embedded in a matrix of injectable and hardenable material, wherein said reinforcing fibres form a multilayer fabric consisting of a plurality of parallel layers disposed one on top of another such that each layer partly covers the layer below it, the number of layers present at any position determining the thickness of said blade at that position, and wherein each of said layers is formed by weft fibres and warp fibres interwoven with said weft fibres, said weft fibres of each layer partly covered by another layer being connected by warp fibres thereof to the weft fibres of at least one layer thereabove over the extent of the surface covered by said at least one layer thereabove, and said weft fibres of each layer partly covering another layer being connected by warp fibres thereof to the weft fibres of at least one layer therebelow.

The multilayer fabric used is therefore integral and preferably extends without interruption from the tip of the blade to the base of the root thereof. It is also preferably flush with the surface of the blade over at least half, and preferably two-thirds, of the length of the aerofoil portion and is continuous between the intrados and the extrados faces of the aerofoil portion.

The invention leads to a feature contrary to conventional wisdom for high-strength blades, since the layers of the fabric open on to the blade surface at their periphery with a variable angle of inclination, the periphery not necessarily being covered by the layer above. In the case of a conventional blade this feature would be very disadvantageous near the leading edge, particularly on the extrados side, since foreign bodies would strike the layers at their ends and would therefore tend to pull them out. This disadvantage does not occur with the present invention since the layers are directly connected to the layers below by the warp fibres—i.e., with connection points which are very close together and which provide great and well-distributed strength.

Advantageously, however, the weft fibres in the portion of each layer not covered by another layer are also connected to the weft fibres of at least one layer therebelow by the warp fibres.

To produce the blade a fibre preform is prepared in the manner hereinbefore described, placed in a mould, and impregnated by the injection of a matrix material which is subsequently subjected to a polymerisation treatment.

To simplify the weaving of the preform the latter may have a simple shape such as a rectangular parallelepiped, and after the injection and setting in the mould the blade is then machined to the required shape. However, this procedure has two disadvantages. Firstly, the weft fibres and warp fibres flush with the surface of the finished blade are partly or completely cut undesirably during the machining of the blade, so that the surface strength thereof, especially regarding impacts, is reduced. Secondly, the procedure is expensive since the machining causes substantial wastage of costly material which has to meet aeronautical standards of performance and quality.

Advantageously, weaving of the preform stops when its shape is that of the finished blade, and the projecting weft fibres and warp fibres are preferably severed at a distance from the respective warp and weft which is from 100% to 150% of the basic warp or weft spacing. The resulting preform is placed in a mould having the shape of the finished blade and the matrix material is injected and cured. The ends of the weft and warp fibres therefore arrive woven over their complete cross-section in the vicinity of the blade surface, so that the surface strength of the blade is improved.

Also, the multilayer fabric with its interlayer connections provided directly by the warp fibres in the dry state—i.e., when not impregnated with resin—is readily deformable by bending of the layers. The preform can therefore be woven flat and will readily take up the camber of the blade when placed in the mould.

The weft fibres may be disposed in the direction of the blade length to improve resistance to centrifugal force. However, in the case of fan blades it is preferred to have the weft fibres oriented in the direction of the "chord" of the aerofoil portion —i.e., from the end of the leading edge to the end of the trailing edge. This arrangement improves the torsional rigidity of the aerofoil portion and is particularly recommended for "large-chord" fan blades in which the width of the aerofoil portion may be substantially equal to the length thereof.

Another important aspect of the invention is the actual texture of the fabric, it having been found that the warp fibres interconnecting the various fabric layers provide an impact delamination resistance which remains adequate even when the angle of inclination of the warp fibres relative to the fabric layers is low. Since the angle of inclination is low, the equivalent strength and elasticity modulus in the plane of the fabric are improved, thus enabling the production of blades reconciling lightness with satisfactory rigidity and satisfactory impact strength, in contrast to the heavier 3D fabrics. In practice, a warp fibre inclination angle of from 5° to 15° is used, the warp fibre changing layers only after having passed at least one, and preferably two or three, weft fibres.

This angle of inclination is noteworthy since the strength of the fabric is virtually independent of the number of layers—2, 3, 4 or more—passed through by each warp fibre.

In order not to leave excessive delamination-promoting gaps between the fibres and not to multiply excessively the number of warp fibres required to be wound separately for weaving, it is preferred to use fibres having from 12000 to 48000 elementary strands and a diameter of the order of 5 mm, at least 60% of the fibre volume being allotted to the warp fibres and at most 40% the volume being allotted to the weft fibres.

Preferably, the weft fibres of each layer are offset relative to the weft fibres of the adjacent layers by a distance equal to half the weft spacing P—i.e., the weft fibres of successive layers are in a staggered arrangement—this arrangement helping to reduce the gaps left between the fibres and thus to improve the resistance to delamination.

Alternatively, the weft fibres may be in line with one another in successive layers. In this case supplementary warp fibres are added to the uncovered portions of the layers in order to reduce the gaps between the fibres, the supplementary warp fibres each being restricted to a single layer.

The blade is very thin over most of its aerofoil portion and fairly thick at its root, the root thickness decreasing in the transition zone between the root and the remainder of the aerofoil portion.

In a first embodiment, the multilayer fabric preform extends continuously between the intrados and the extrados faces over the entire area of the aerofoil portion. To form the extra thickness of the root the two adjacent fabric layers disposed at the centre of the thickness of the preform are not connected by the warp fibres in the root zone. Consequently, the fabric can be divided at the root into two portions which are kept apart by an insert during moulding. However, this structure has the disadvantage of complicating the weaving because of the large number of fibres and because of the interruption of weaving between the two adjacent central layers at the root.

In a second embodiment which simplifies weaving, the preform is assembled and possibly stitched together in three parts comprising an integral woven multilayer preform having the shape of the aerofoil portion and extended into the transition zone and the root, and two conventional preforms making up the remaining volume of the transition zone and the root and possibly stitched to the flanks of the preform defining the aerofoil portion. The root thickness may be further increased by inserts placed locally between the layers.

Technically, the present blade cannot be confused with the blade described in French Patent 2 664 941 since the performance of the stitched interlayer connections of the latter is very inferior to the directly woven interlayer connections of the invention, which have a large number of close-together connection points and therefore provide a substantial and well-distributed interlayer strength. Also, the matrix gaps left unconnected between two layers are very much reduced, which inhibits the commencement of any delamination.

In other words, the effect of using a multilayer woven fabric extending unbroken between the intrados and extrados faces is to inhibit the start and spreading of delamination, whereas the use of a stitched assembly of a plurality of fabric layers inhibits the spreading of delamination but not the start thereof. These two different arrangements cannot therefore be regarded as equivalents.

Nor can the invention be confused with that disclosed by U.S. Pat. No. 5,279,892, because all the layers are parallel to one another and are interconnected by the warp fibres to form a single multilayer fabric extending continuously between the intrados face and the extrados face at least in the top half, and preferably the top two-thirds, of the blade. The resulting blade is particularly resistant to delamination, especially in its upper and thinnest part.

The multilayer fabric in accordance with the invention, in which the layers are interconnected directly by the warp fibres, also cannot be compared in its present use to the conventional 3D, 4D etc. fabrics. With the parameters specified the multilayer fabric of the invention provides a weight-stiffness compromise with sufficient impact strength to enable a wide-chord fan blade to be made to the F.A.A. specifications. It also enables the preform to be woven flat directly in the shape of the blade, or at least the aerofoil portion, with final cambering and twisting being provided by the mould. Furthermore, no supplementary draping of fibres on the blade surface is necessary.

French Patent 2 610 951 describing this kind of fabric suggests its use in a thin structure such as elements for protecting space craft at re-entry into the atmosphere, but it does not suggest a use for profiled articles with weaving of the preform to the shape of the article.

With a carbon fibre having a tensile modulus E>270 GPa($270 \cdot 10^9$ pascals), a tough epoxy resin and a fibre content of 60% by volume, we have obtained tensile elasticity moduli in the directions of the weft fibres, warp fibres and perpendicularly to the plane of the top layers of 40 GPa, 10 GPa and 10 GPa respectively, a torsion modulus in the plane of the layers of more than 5.5 GPa, and a propagation energy of delamination cracks between the layers of more than 2000 J/m$^2$.

The invention will now be described in more detail with reference to the preferred embodiments, given by way of non-limitative example, and with reference to the accompanying diagrammatic drawings.

BRIEF DESCRIPTION OF THE DRAWINGS

FIG. 1 is a face view of a large-chord fan blade constructed in accordance with the invention.

FIG. 2 is a cross-sectional view of the blade on the line A—A in FIG. 1, but taking no account of the camber of the blade. For the sake of clarity the various layers of the fabric in the blade are shown separated from one another, and not all of them are necessarily shown.

FIG. 3 is a diagram illustrating the weave of the fabric used in the blade.

FIG. 4 is a partial longitudinal section through the blade on the line B—B in FIG. 1 and showing the structure of the root when the fabric preform is in one piece.

FIG. 5 is a view similar to FIG. 4 but showing an alternative structure for the root when the fabric preform is formed in three parts.

DESCRIPTION OF THE PREFERRED EMBODIMENT

Referring first to FIG. 1, the blade 1 comprises an aerofoil portion 2 integrally joined to a root 3 through a transition zone 4. The blade 1 is made of a composite material having a carbon fibre base embedded in a tough epoxy resin matrix, and has, in known manner, a leading edge 5 of TA6V titanium alloy fitted and bonded to the rest of the blade, the leading edge 5 extending over the whole length of the aerofoil portion 2.

The blade 1 is reinforced by a carbon fibre preform (not shown in FIG. 1) extending from the tip 6 of the aerofoil portion 2 to the base 7 of the root 3, and from the leading edge 5 to the trailing edge 8. The aerofoil portion 2 reduces in thickness towards the leading edge 5, the tip 6 and the trailing edge 8, and is thicker at its centre and towards the root 3, this thickness variation being represented by isoclinal curves 9.

Referring now to FIG. 2, the aerofoil portion 2 is reinforced by a multilayer woven carbon fibre fabric 15. the reference 16 denotes any layer, the references 16a denote any layer above the layer 16, and the references 16b denote any layer below the layer 16. At any point on the aerofoil portion 2 the number of superposed layers 16 present determines the thickness of the portion 2 at that position so as to form the shape of the portion 2. Except for the top layer 16c each layer 16 is completely or partly overlapped by at least one layer 16a above it. Conversely, each layer 16, including the top layer 16c, completely or partly overlaps at least one lower layer 16b. Lines 17, 17a respectively define the outer limits of layers 16, 16a, and it will be seen that each layer 16 has an uncovered area 18 between the lines 17 and 17a, the remainder of its surface 19 being covered by the layer 16a immediately above it. The fabric 15 is embedded in the matrix bounded by the surface 20 of the aerofoil portion. The fitted leading edge 5 has an outer surface 21 which is an extension of the surface 20, and an inner surface 22 which is complementary to the surface 23 at the corresponding edge of the aerofoil portion 2, the surfaces 22 and 23 being glued together by tehcniques familiar to the skilled addressee to fix the leading edge 5 to the aerofoil portion 2.

The various layers 16 each comprise weft fibres arranged in the direction of the chord of the aerofoil portion 2—i.e., in directions parallel to the direction from the front 25 of the leading edge 5 to the rear 8 of the trailing edge. The warp fibres interconnecting the weft fibres of each layer 16 also each connect either the weft fibres of the adjacent layer 16a above it or the weft fibres of the adjacent layer 16b below it, and thus directly provide woven cohesion between the layers 16 of the entire fabric 15. The top layer 16c is of course connected only to the layer immediately below it. Also, the uncovered area 18 of each layer 16 is connected by weaving to the layer 16b immediately below.

Clearly, all the layers 16 are progressively interconnected by the warp fibres to form a single multilayer woven fabric which is thus continuous from the intrados face 20a to the extrados face 20b of the aerofoil portion 2. The layers 16 are parallel to one another and to an imaginary surface disposed midway between the intrados face 20a and the extrados face 20b.

Referring now to FIG. 3, the layers 16, 16a, 16b comprise weft fibres 30 interconnected by warp fibres 31, the weft fibres 30 being perpendicular to the plane of FIG. 3 and being shown end-on. Some warp fibres 31 connect the weft fibres 30 of layer 16 to the weft fibres 30 of the layer 16a immediately above, while other warp fibres 31 connect the same weft fibres 30 of the layer 16 to the weft fibres 30 of the layer 16b immediately below. This arrangement is repeated from layer to layer to form an integral fabric. The weft fibres 30 of the layer 16 are aligned with the immediately opposite weft fibres 30 of the adjacent layers 16a, 16b. In other words, seen end-on, the weft fibres 30 form a network of which the basic mesh is a rectangle.

The warp fibres 31 form a maximum angle $\alpha$ of from 5° to 15° with respect to the layer 16. The weft fibres 30 and the warp fibres 31 comprise from 12000 to 48000 elementary strands twisted not too tightly so that after weaving the fibres have a flattened cross-section verging on an ellipse. The warp fibres 31 make up at least 60% of the fibre volume, and the fibre volume makes up about 60% of the total volume. There are well-known empirical formulae available to the skilled addressee which show the relationship between these parameters and the thickness of the layers. In this example the angle $\alpha$, which is low, is obtained by the warp fibres 31 of the layer 16 changing direction every two weft fibre intervals, each warp fibre 31 returning to the initial layer every four weft fibre intervals. The warp fibres 31 in planes parallel to the plane of FIG. 3 are offset by one weft interval at each change of plane, and therefore return to an identical position every four planes.

Advantageously, in order to increase the fibre density in the uncovered areas 18 of the layers 16, supplementary warp fibres 32 are provided which are woven only with the weft fibres 30 in the uncovered area 18, the supplementary warp fibres 32 passing alternately above and below successive weft fibres 30.

Referring now to FIG. 4, in this embodiment the extra thickness of the root 3 is obtained by interrupting the weaving between the two adjacent layers 16d disposed at the centre of the fabric thickness, but only in the zone of the root 3, and by providing an insert 37 between the two layers 16d to keep them apart. The assembly is then placed in the mould, impregnated with resin and polymerised, the space 38 at the apex of the insert 37 being filled by the resin, Such a structure is very strong and light.

Referring back to FIG. 1, in an alternative embodiment the fabric is integral over the whole of the blade 1 up to a thickness corresponding to the isocline 9a, i.e. 21 mm in this example. Beyond this, the additional fabric thickness is obtained by the application of supplementary fitted and stitched single-layer fabric sheets 35. Stitched fabric sheets can be used in this zone—i.e. at the centre and at the bottom of the aerofoil portion 2 towards the root 3—since there is very little exposure to impacts from foreign bodies in this region.

The apex 9b of the isocline 9a—i.e., the furthest point of the isocline 9a from the bottom 7 of the blade—is separated from the bottom 7 of the blade by a distance d1 corresponding at most to half the length d2 of the blade 1 taken between the bottom 7 and the tip 6, in order to limit the area of fitted fabric 35 which is less resistant to shocks caused by foreign bodies. Preferably, however, the relative fitted fabric height d1/d2 is of the order of ⅓, which is still sufficient to support the blade 1 satisfactorily while leaving the fitted fabric 35 in the least exposed lower zones. The warp and weft fibres of the fabric sheets 35 are preferably inclined at 45° to the chord of the blade in order to increase the torsional resistance thereof.

Referring now to FIG. 5, the single multilayer fabric 15 is clamped on opposite sides by the fitted and stitched fabric sheets 35, the number of supplementary sheets increasing with the thickness of the blade towards the root 3. The flared shape of the root 3 is produced by placing inserts 36 between the sheets 35 by a technique which is familiar to the skilled addressee.

The flat dry preform thus formed is then placed in a mould having the shape of the blade, particularly as regards the twist and camber of the aerofoil portion, and the injection of the thermosetting resin and the curing heat cycle for the resin are performed by techniques familiar to the skilled addressee.

Clearly, the main parameters of the structure of the fabric in accordance with the invention are the angle of inclination $\alpha$ of the warp fibres 31, the number of strands making up the warp fibres 31 and the weft fibres 30, the volume distribution of the warp and weft fibres and the total volume percentages of fibre. The other elements depend mainly upon the weaver's skill, for example, the number of layers passed through by each warp fibre, the number of basic weft fibre intervals passed through by the warp fibre at each change of layer, and the aligned or staggered arrangement of the weft fibres.

Clearly, too, the maximum thickness of the multilayer fabric depends upon the cross-section of the fibres and upon the number of fibre bobbins which the weaver can use to produce the fabric.

Another advantage of the invention is that the blade 1, at least so far as the aerofoil portion 2 is concerned, can be produced directly by moulding to its final shape without additional machining. Similar considerations apply to the surface 20 of the aerofoil portion, except for the fitted leading edge 5, and to the surface 23 to which the leading edge 5 is fixed.

We claim:

1. A turbomachine blade made of a composite material comprising reinforcing fibres embedded in a matrix of injectable and hardenable material, wherein said reinforcing fibres form single multilayer fabric extending continuously between an intrados face and an extrados face consisting of a plurality of parallel layers disposed one on top of the other such that each layer partly covers the layers below it, the number of layers present at any position determining the thickness of said blade at that position, and wherein each of said layers is formed by weft fibres and warp fibres interwoven with said weft fibers, said weft fibers of each layer partly covered by another layer being connected by warp fibres thereof to the weft fibres of at least one layer thereabove over the extent of the surface covered by said at least one layer thereabove, and said weft fibres of each layer partly covering another layer being connected by warp fibres thereof to the weft fibres of at least one layer therebelow.

2. A turbomachine blade according to claim 1, wherein the weft fibres in the portion of each layer not covered by another layer are also connected by the warp fibres thereof to the weft fibres of at least one layer therebelow.

3. A turbomachine blade according to claim 1, wherein said reinforcing fibres form an integral multilayer fabric which extends from the tip of the aerofoil portion of said blade as far as the base of the root of said blade.

4. A turbomachine blade according to claim 1, wherein said reinforcing fibres form an integral multilayer fabric which is substantially flush with the surface of said blade at least over the top half of the length of the aerofoil portion of said blade and which is continuous from the intrados face to the extrados face of said aerofoil portion.

5. A turbomachine blade according to claim 1, wherein the ends of said weft fibres of each layer extend beyond said warp fibres interwoven therewith and are severed at a distance from said warp fibres which is from 100% to 150% of the warp fibre spacing, said ends of said weft fibres lying with their full cross-section near the surface of said blade.

6. A turbomachine blade according to claim 1, wherein the ends of said warp fibres of each layer extend beyond said weft fibres interwoven therewith and are severed at a distance from said weft fibres which is from 100% to 150% of the weft fibre spacing, said ends of said warp fibres lying with their full cross-section near the surface of said blade.

7. A turbomachine blade according to claim 1, wherein said weft fibres of each layer extend in the direction of the blade length, which is a direction from the base of the blade root to the tip of the aerofoil portion of the blade.

8. A turbomachine blade according to claim 1, wherein said weft fibres of each layer extend in the direction of the blade width, which is in a direction from the leading edge towards the trailing edge of the blade.

9. A turbomachine blade according to claim 1, wherein said warp fibres of each layer make a maximum angle $\alpha$ of from 5 to 15° with the adjacent layer or layers with which they are interwoven.

10. A turbomachine blade according to claim 1, wherein said weft fibres and said warp fibres comprise from 12000 to 48000 elementary strands.

11. A turbomachine blade according to claim 1, wherein said warp fibres constitute at least 60% of the total fibre volume.

12. A turbomachine blade according to claim 1, wherein said weft fibres of each layer are offset by half the weft fibre spacing with respect to said weft fibres of the adjacent layers.

13. A turbomachine blade according to claim 1, wherein said weft fibres of each layer are aligned with the weft fibres of the adjacent layers.

14. A turbomachine blade according to claim 13, wherein supplementary warp fibres are disposed in the uncovered area of each layer in order to fill the gaps left between the warp fibres and the weft fibres thereof.

15. A turbomachine blade according to claim 1, fabric extends said multilayer fabric extends continuously from the intrados face to the extrados face over the whole area of the aerofoil portion of said blade, and the two adjacent layers disposed at the centre of the thickness of said fabric are not interconnected by warp threads in the root zone of said blade, said two layers being separated by an insert to provide said root with extra thickness.

* * * * *

UNITED STATES PATENT AND TRADEMARK OFFICE
CERTIFICATE OF CORRECTION

PATENT NO. : 5,672,417
DATED : SEPTEMBER 30, 1997
INVENTOR(S) : CHAMPENOIS ET AL

It is certified that error appears in the above-identified patent and that said Letters Patent is hereby corrected as shown below:

Column 10, line 15 and 16, change "fabric extends" to --wherein--.

Signed and Sealed this

Fourteenth Day of April, 1998

Attest:

BRUCE LEHMAN

*Attesting Officer*   *Commissioner of Patents and Trademarks*